US012631186B1

(12) United States Patent
Zhang

(10) Patent No.: US 12,631,186 B1
(45) Date of Patent: May 19, 2026

(54) CONNECTING ROD ASSEMBLY USABLE FOR ROD PUMP

(71) Applicant: Bosen Zhang, Zhejiang (CN)

(72) Inventor: Bosen Zhang, Zhejiang (CN)

(*) Notice: Subject to any disclaimer, the term of this patent is extended or adjusted under 35 U.S.C. 154(b) by 0 days.

(21) Appl. No.: 19/262,528

(22) Filed: Jul. 8, 2025

Related U.S. Application Data

(63) Continuation-in-part of application No. 19/244,049, filed on Jun. 20, 2025.

(30) Foreign Application Priority Data

Mar. 6, 2025 (CN) ........................ 202520387604.X
Mar. 18, 2025 (CN) ........................ 202510321058.4
Mar. 28, 2025 (CN) ........................ 202520571104.1

(51) Int. Cl.
*F04D 13/06* (2006.01)
*H01R 13/52* (2006.01)

(52) U.S. Cl.
CPC ..... *F04D 13/0693* (2013.01); *H01R 13/5219* (2013.01)

(58) Field of Classification Search
CPC .... F04B 53/162; F04B 53/22; F04D 13/0693; H01R 13/5219
See application file for complete search history.

(56) References Cited

FOREIGN PATENT DOCUMENTS

CN 119934013 * 5/2025

* cited by examiner

*Primary Examiner* — Nathaniel E Wiehe
*Assistant Examiner* — Maxime M Adjagbe
(74) *Attorney, Agent, or Firm* — Hawaii Patent Services; Nathaniel K. Fedde; Kenton N. Fedde

(57) ABSTRACT

The present disclosure relates to a connecting rod assembly usable for a rod pump, comprising a connecting rod, wherein at least one end of the connecting rod is fixedly provided with a male conductive connector or a female conductive connector. The connecting rod comprises an inner tube and an outer tube, the outer tube is sleeved outside the inner tube, and a gap exists between the inner tube and the outer tube. Both the male conductive connector and the female conductive connector are electrically connected with wires, which are located within the gap.

20 Claims, 10 Drawing Sheets

CONNECTING ROD ASSEMBLY USABLE FOR ROD PUMP

This application is a continuation-in-part of U.S. patent application Ser. No. 19/244,049, entitled "Rod-Shaped Water Pump", filed on Jun. 20, 2025, the entire content of which is hereby incorporated by reference in its entirety.

TECHNICAL FIELD

The present disclosure relates to the technical field of water pumps, and particularly relates to a connecting rod assembly usable for a rod pump.

BACKGROUND

Water pumps are a commonly used water pumping tool at present. Among them, the rod-shaped water pump is a lightweight water pump that has emerged in recent years. Its overall shape is a straight rod. The middle part is the rod-shaped water pump body. The water pump is fixed at the lower end of the rod-shaped water pump body, and the power supply and the water outlet are connected to the upper end of the rod-shaped water pump body. Liquids such as sewage and oil pumped by the water pump pass through the rod-shaped water pump body and are then discharged through the water outlet.

However, when pumping water, in order to liberate labor, users generally lean the rod-shaped water pump against the edge of a water pumping place such as a pool to let it pump water automatically. This results in the water pump at the lower end of the rod-shaped water pump body being in an inclined state. When the water in the pool and other places is almost pumped out, the inclined water pump cannot pump out water and other liquids at the bottom cleanly. Unless the user straightens the rod-shaped water pump to make the water pump fit the bottom of the pool and other places, this brings certain inconvenience to the use of the rod-shaped water pump.

Secondly, in existing rod pumps, the water pump is basically set at the lower end of the connecting rod, and the power supply and the water outlet are set at the upper end of the connecting rod. The wires for power supply between the power supply and the water pump pass through the connecting rod. However, since the liquid pumped by the water pump also passes through the connecting rod, this causes the wires to be immersed in the liquid when the rod pump is in use. When the liquid pumped by the water pump contains corrosive substances, the wires are easily corroded and damaged or leak electricity when immersed in the liquid for a long time. In addition, when the wires are damaged, the water pump may be burned out or a safety accident of electric shock may occur due to electric leakage.

Moreover, when it is necessary to dredge a place such as a pool that has not been dredged for a long time, the existing rod-shaped water pump cannot well pump out the silt deposited at the bottom of the water. This requires the user to prepare additional tools for dredging, which brings inconvenience to the use.

SUMMARY

The present disclosure provides a connecting rod assembly usable for a rod pump to solve the problems raised in the above background art.

A connecting rod assembly usable for a rod pump comprises a connecting rod. At least one end of the connecting rod is fixedly provided with a male conductive connector or a female conductive connector; the connecting rod comprises an inner tube and an outer tube, the outer tube is sleeved outside the inner tube, and a gap exists between the inner tube and the outer tube. Both the male conductive connector and the female conductive connector are electrically connected with wires, which are located within the gap. The male conductive connector on one connecting rod is docked and fixed with the female conductive connector on an adjacent connecting rod to achieve conductivity, and the inner tube is configured for water or air passage.

A connecting rod assembly usable for a rod pump comprises an inner tube and an outer tube arranged coaxially, with a sealed annular gap formed between the inner tube and the outer tube; a conductive circuit arranged in the annular gap; and a male conductive connector located at a first end of a connecting rod, comprising: a first connector sealingly fixed to the inner tube; a plurality of conductive contact pieces; and a first through hole penetrating the inner tube; and a female conductive connector located at a second end of the connecting rod, comprising: a second connector sealingly fixed to the inner tube; conductive rings and insulating rings; and a second through hole penetrating the inner tube. The conductive contact pieces form a detachable electrical connection with the conductive rings, and the first through hole and the second through hole form a continuous fluid channel.

A connecting rod assembly for a rod pump comprises a main delivery tube internally provided with a fluid channel; a conductive tube arranged outside the main delivery tube in parallel, internally provided with a conductive circuit; a plug connecting part located at a first end of a connecting rod, provided with conductive probes and a fluid plug connector; and a receptacle part located at a second end of the connecting rod, provided with a conductive contact piece matching the conductive probe and a fluid socket. The fluid plug connector is provided with a diversion channel, which connects the fluid plug connector and the main delivery tube.

In order to achieve the above inventive purpose, the following technical solutions are adopted in the present disclosure:

Since the connecting frame is fixed at the lower end of the rod-shaped water pump body and the pump assembly is hinged to the connecting frame, the pump assembly is rotatable. When in use, even if the rod-shaped water pump is leaned against a pool or other places, the bottom surface of the pump assembly can fit the bottom of the pool or other places, so that the rod-shaped water pump can automatically suck water and other liquids in the pool or other places clean without the user's hand support, which is convenient to use. In addition, since telescopic rods are provided on the rod-shaped water pump body, the telescopic rods can be pulled out as support legs as needed, so that the rod-shaped water pump is in an upright state. When not in use, the telescopic rods can be retracted and used as an auxiliary handle.

When dredging is required, rotate the rotating shaft so that the triggering bump contacts the first triggering switch. At this time, the first through hole on the rotating shaft is opposite to the air inlet on the shaft seat, the third through hole on the rotating shaft is opposite to the water inlet on the shaft seat, and the water outlet is in a closed state. The rod-shaped water pump is in the blowing mode. At the same time, the fan works, and blows air to the silt at the bottom of the water through the air inlet, the water inlet and the fixing tube to stir the silt. Then rotate the rotating shaft so that the second through hole is opposite to the water inlet, the third through hole is opposite to the water outlet, and the air inlet is in a closed state. The rod-shaped water pump is in the water pumping mode. At this time, the triggering bump contacts the second triggering switch, the fan is powered off, the water pump works, pumps the sewage and discharges the sewage with silt through the fixing tube, the water inlet and the water outlet.

By replacing the traditional connecting rod in the rod pump with a connecting rod, the wires between the pump assembly and the power supply box can be separated from the pumped liquid, achieving the separation of water and electricity without interference. This avoids the corrosion of the wires by the liquid and the safety hazards caused by wire leakage. Moreover, the connecting rod can be butt-jointed and lengthened as needed to meet the length requirements of the rod pump in different usage scenarios. In addition, the connecting rod of this rod pump can also be applied in scenarios such as mechanical tools that are easy to disassemble and assemble and require length adjustment.

BRIEF DESCRIPTION OF DRAWINGS

The drawings, which form a part of this application, are used to provide a further understanding of the present disclosure. The schematic embodiments of the present disclosure and the descriptions thereof are used to explain the present disclosure and do not constitute an improper limitation of the present disclosure. In the drawings.

Figure 1:
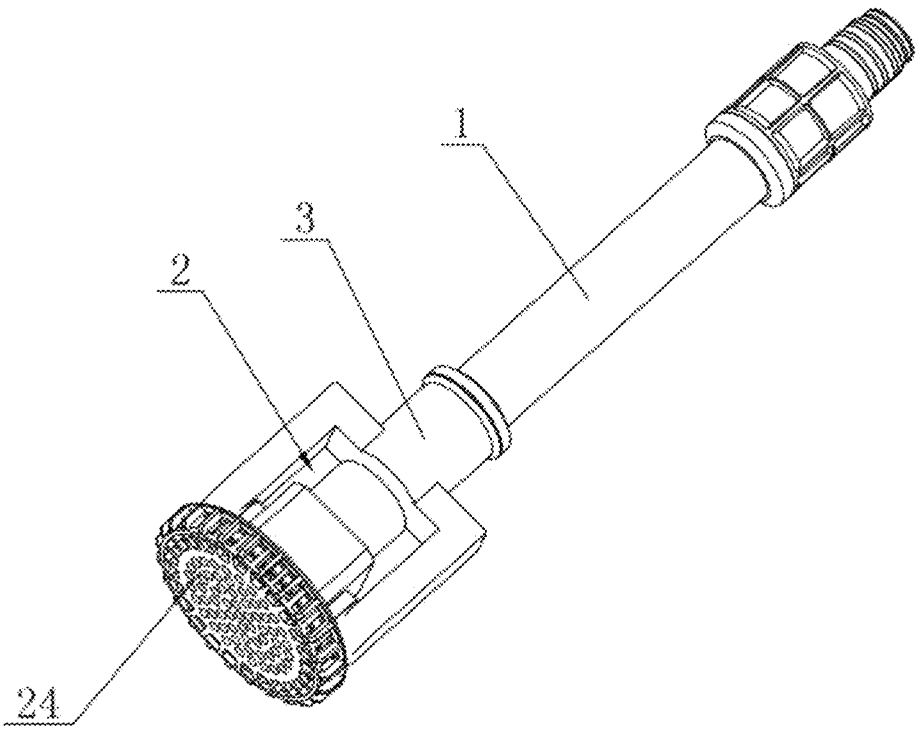
FIG. 1 is a three-dimensional schematic diagram of an embodiment provided by the present disclosure.

Reference signs in the drawings: Rod-shaped water pump body (1); Pump assembly (2); Motor mounting seat (21); Motor (22); Volute casing (23); Filter cover (24); Impeller (25); Circular hole (26); Liquid passing hole (27); Connecting frame (3); Channel (31); Connecting wire (4); Mounting ring (5); Telescopic rod (6); Fixing seat (7); Power supply box (8); Fixing tube (9); Shaft seat (10); Water inlet (101); Water outlet (102); Air inlet (103); Limit slot (104); Positioning groove (105); Fan (11); Rotating shaft (12); First through-hole (121); Second through-hole (122); Third through-hole (123); Triggering bump (124); Knob (125); Sealing rubber sleeve (13); Fourth through-hole (131); Positioning rib (132); First triggering switch (14); Second triggering switch (15); Connecting rod (16); Inner tube (161); Outer tube (162); Gap (163); Wire (164); Male conductive connector (17); First connector (171); Conductive contact piece (172); Fifth through-hole (173); Side hole (174); First connecting sleeve (175); Female conductive connector (18); Insulating presser foot (180); Second connector (181); Conductive ring (182); Sixth through-hole (183); Conductive connecting pin (184); Positioning groove (185); Insulating ring (186); Pressing sleeve (187); Second connecting sleeve (188); Limit ring (189); Auxiliary handle (19).

DESCRIPTION OF EMBODIMENTS

The technical solution in the embodiment of the present disclosure will be clearly and completely described below with reference to the drawings. Obviously, the described embodiment is part of, rather than all of the embodiments of the present disclosure. The following description of at least one exemplary embodiment is illustrative in nature and is in no way intended to limit the present disclosure, its application or uses. Based on the embodiments in the present disclosure, all other embodiments obtained by those skilled in the art without creative work belong to the scope of protection of the present disclosure.

It should be noted that the terminology used here is only for describing specific embodiments, and is not intended to limit exemplary embodiments according to the present application. As used herein, the singular form is also intended to include the plural form unless the context clearly indicates otherwise. Furthermore, it should be appreciated that when the terms "comprising" and/or "including" are used in this specification, they specify the presence of features, steps, operations, devices, components and/or combinations thereof.

Unless otherwise specified, the relative arrangement of components and steps, numerical expressions and numerical values set forth in these embodiments do not limit the scope of the present disclosure. At the same time, it should be appreciated that for the convenience of description, the dimensions of various parts shown in the drawings are not drawn according to the actual scale relationship. Techniques, methods and equipment known to those skilled in the art may not be discussed in detail, but in appropriate cases, they should be regarded as part of the authorization specification. In all the examples shown and discussed herein, any specific values should be interpreted as illustrative, and not as limiting. Therefore, other examples of exemplary embodiments may have different values. It should be noted that similar numbers and letters indicate similar items in the following drawings, therefore once an item is defined in one drawing, it does not need to be further discussed in subsequent drawings.

Figure 2:
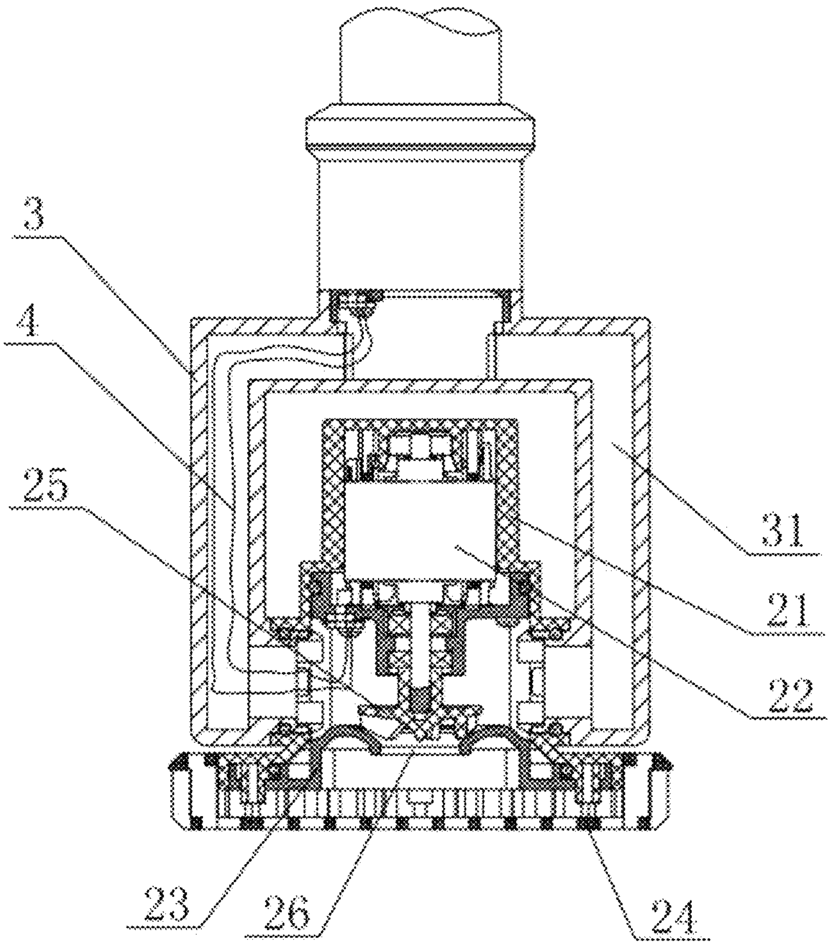
FIG. 2 is a cross-sectional view of the embodiment in FIG. 1.
Figure 3:
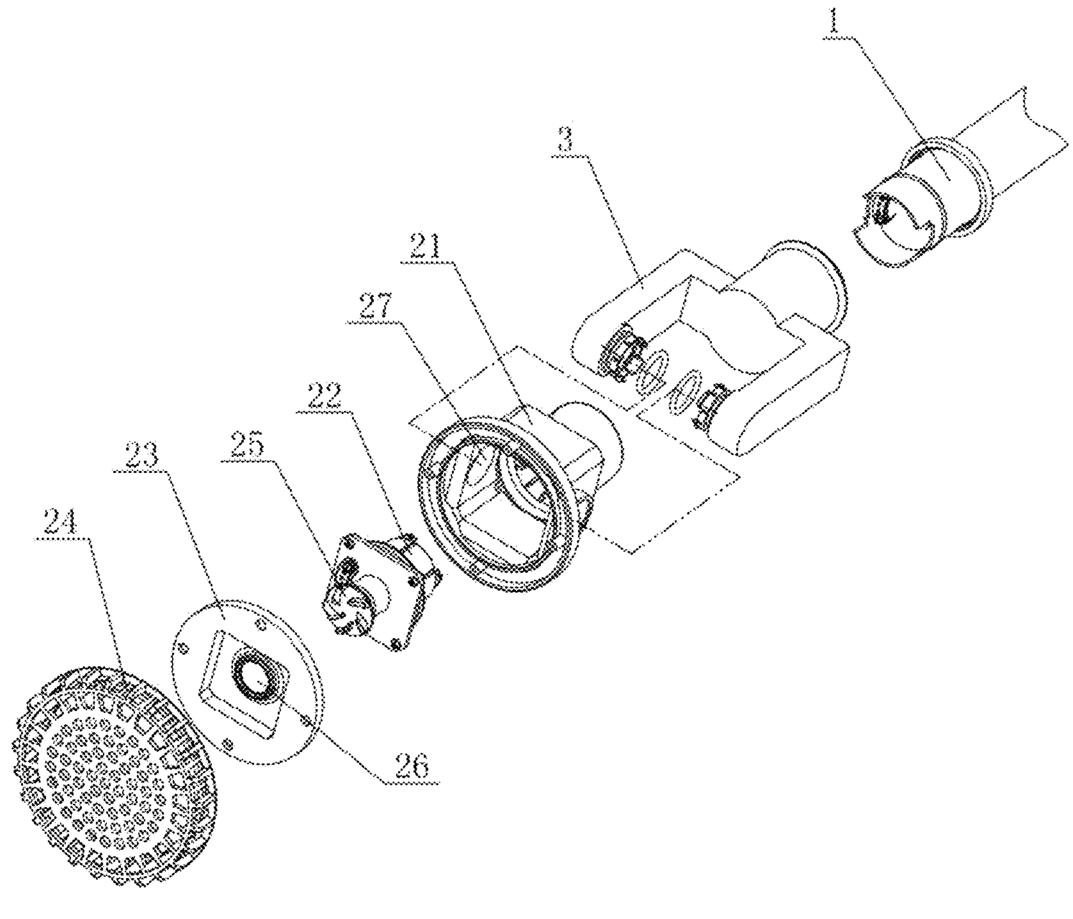
FIG. 3 is an exploded schematic diagram of the embodiment in FIG. 1.

As shown in FIGS. 1, 2, and 3, a rod-shaped water pump includes a rod-shaped water pump body 1 and a pump assembly 2 located at the lower end of the rod-shaped water pump body 1. Water is pumped out through the pump assembly 2. A connecting frame 3 is fixedly arranged at the lower end of the rod-shaped water pump body 1. The connecting frame 3 serves as a passage between the rod-shaped water pump body 1 and the pump assembly 2. When the pump assembly 2 sucks in water, the water is sent to the rod-shaped water pump body 1 through the connecting frame 3. The pump assembly 2 includes a motor mounting seat 21, a motor 22, a volute casing 23, and a filter cover 24. Water is filtered through the filter cover 24. The motor mounting seat 21 is hinged to the connecting frame 3, and a sealing gasket is provided between the motor mounting seat 21 and the connecting frame 3 to seal the motor mounting seat 21 and the connecting frame 3. Since the connecting frame 3 is fixed at the lower end of the rod-shaped water pump body 1 and the pump assembly 2 is hinged to the connecting frame 3, the pump assembly 2 is rotatable. During use, even if the rod-shaped water pump is leaned against a pool or other places, the bottom surface of the pump assembly 2 can fit the bottom of the pool or other places, so that the rod-shaped water pump can automatically suck water and other liquids in the pool or other places dry without the need for the user to hold it by hand, which is very convenient to use. A mounting hole is provided at the lower end of the motor mounting seat 21. The motor 22 is fixed inside the motor mounting seat 21, and the motor 22 is installed inside the motor mounting seat 21 through the mounting hole. An impeller 25 is fixedly arranged on the drive shaft of the motor 22, and the impeller 25 is driven to rotate by the motor 22.

The filter cover 24 and the volute casing 23 are both fixed at the lower end of the motor mounting seat 21, and the volute casing 23 is located inside the motor mounting seat 21. The volute casing 23 makes the water flow form a certain rotation when entering the motor mounting seat 21, which can supply water evenly. The volute casing 23 is provided with a circular hole 26, which facilitates the water to enter the motor mounting seat 21 through the circular hole 26. The impeller 25 is located above the circular hole 26. The motor mounting seat 21 is provided with a liquid passing hole 27. The water that enters the motor mounting seat 21 through the circular hole 26 is sent to the liquid passing hole 27 by the impeller 25. A channel 31 is provided inside the connecting frame 3. The channel 31 is respectively connected with the rod-shaped water pump body 1 and the liquid passing hole 27. After the water enters the liquid passing hole 27, it enters the rod-shaped water pump body 1 through the channel 31. The connecting wire 4 between the wire connection point at the lower end of the rod-shaped water pump body 1 and the wire connection point on the motor 22 passes through the channel 31. The connecting wire 4 passes through the channel 31 and is connected with the motor 22 to supply power to the motor 22.

Here, a waterproof layer is provided on the outer side of the connecting wire 4 to prevent the connecting wire 4 from leaking electricity due to water flow during use.

In the above embodiment, the wire connection point at the lower end of the rod-shaped water pump body 1 and the wire connection point on the motor 22 are the existing wire connection points in the rod-shaped water pump.

In other embodiments (not shown), the rod-shaped water pump body 1 adopts a segmented structure, including an upper segment and a lower segment, which are connected by a quick connector to realize quick disassembly and assembly.

In other embodiments (not shown), the upper half of the motor mounting seat 21 is a hemispherical cavity, and the lower half is a cylindrical mounting cylinder. The two are connected by a flange, and the connection is stable. The inner wall of the cavity is provided with heat dissipation fins for dissipating heat from the motor 22 in the motor mounting seat 21.

Figure 4:
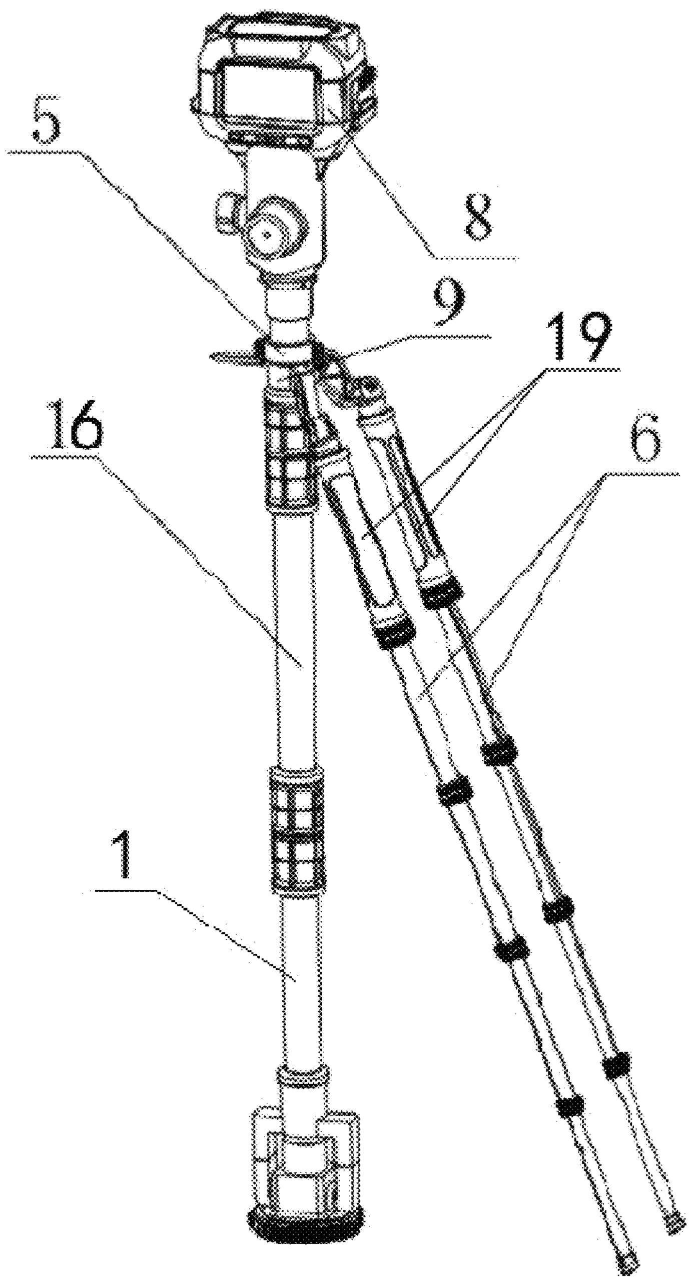
FIG. 4 is a schematic diagram of the upright state of the embodiment in FIG. 1 after installing the telescopic rods.
Figure 5:
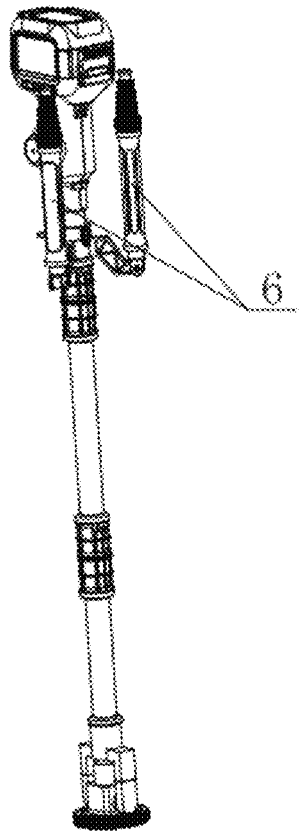
FIG. 5 is a schematic diagram of the state where the telescopic rod of the embodiment in FIG. 1 is used as an auxiliary handle.
Figure 6:
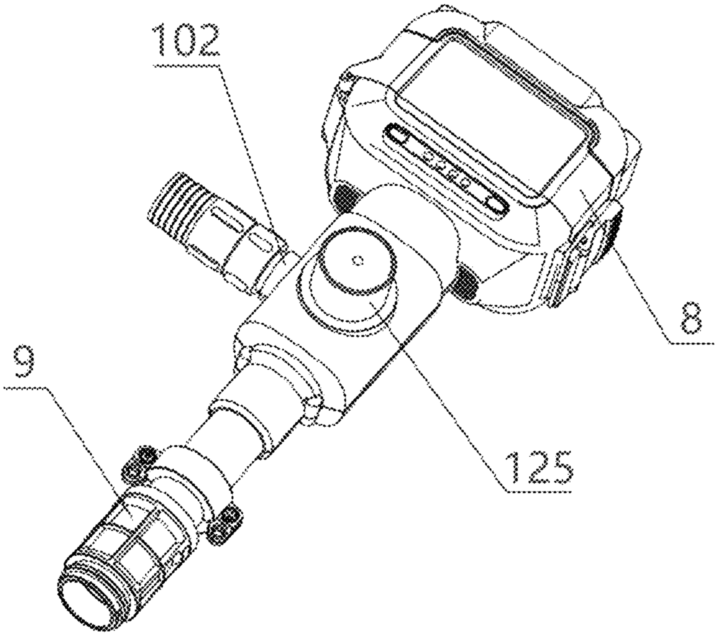
FIG. 6 is a three-dimensional schematic diagram of the power supply box and the fixing tube of the embodiment in FIG. 4.

As shown in FIGS. 4 and 5, in order to facilitate the vertical placement of the rod-shaped water pump, a fixing tube 9 can also be fixedly arranged at the upper end of the rod-shaped water pump body 1. A mounting ring 5 is fixedly arranged on the outer side of the fixing tube 9. At least two telescopic rods 6 are hinged on the mounting ring 5. As long as the telescopic rods 6 are pulled down to form support legs, the rod-shaped water pump can be in an upright state to prevent it from tipping over. When the rod-shaped water pump is not in use, the telescopic rods 6 can be folded up. The folded telescopic rods 6 can also be used as auxiliary handled 19. After being folded, the volume is small and it is convenient to store.

It can be understood that a tripod is formed by the cooperation of the two telescopic rods 6 and the rod-shaped water pump body 1 to support the rod-shaped water pump upright. This not only ensures the stability of the rod-shaped water pump and prevents it from tipping over during use, but also does not require an additional rod to cooperate with the telescopic rods 6, thus reducing the cost.

In addition, a locking buckle is provided between the mounting ring 5 and the telescopic rod 6. The telescopic rods 6 can be adjusted in angle as required and locked after the angle is adjusted.

In other embodiments (not shown), the mounting ring 5 adopts a split design, including: a fixed ring fixed to the rod-shaped water pump body 1 through a set screw; a rotating ring sleeved outside the fixed ring and rotatable around the axis by +180°. The ring body is provided with a chute for easy installation.

In other embodiments (not shown), the telescopic rod 6 includes: an outer tube with a polygonal cross-section; an inner rod with serrated anti-slip patterns machined on the surface and a quick plug connector at the top; a length locking device using a ratchet-pawl mechanism with 3 preset gears for easy telescopic adjustment as needed.

In other embodiments (not shown), only one telescopic rod 6 is designed. A support leg is designed at the bottom end of the telescopic rod 6, and it can also be used upright in cooperation with the rod-shaped water pump body 1.

As shown in FIGS. 4, 6, 7 and 8, it also includes a fixing seat 7. The upper end of the fixing seat 7 is fixed to the power box 8, and the lower end is fixed to the fixing tube 9. A shaft seat 10 is integrally provided on the fixing seat 7. The shaft seat 10 is provided with a water inlet 101 and a water outlet 102. The water inlet 101 is connected to the fixing tube 9 for sending water to the inside of the shaft seat 10. The water outlet 102 is connected to the outside for discharging the sucked water to the outside. A fan 11 is fixedly arranged in the fixing seat 7. The fan 11 is electrically connected to the power box 8, and the power box 8 supplies power to the fan 11 to make the fan 11 work.

In other embodiments (not shown), the top of the fixing seat 7 is rigidly connected to the power box 8 through M6 bolts distributed at the four corners, and the bottom is in sealed cooperation with the fixing tube 9 through a flange interface, which is convenient for installation and has a good sealing effect.

In other embodiments (not shown), the water outlet 102 adopts a gradually expanding design (with a diffusion angle of) 15° to reduce the outlet turbulence.

In other embodiments (not shown), the air inlets 103 opened on the side wall of the shaft seat 10 are in a circular hole array evenly distributed circumferentially. A guide grille is provided inside the air inlet 103, and the grille inclination angle is 45° to optimize the air flow direction.

Figure 7:
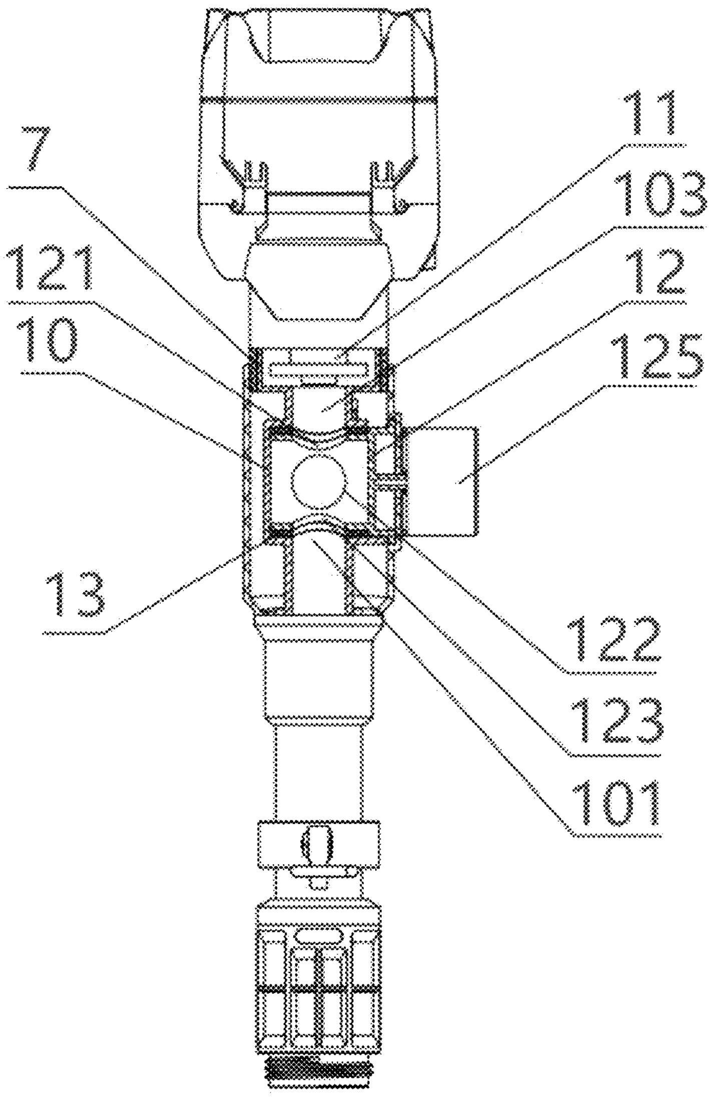
FIG. 7 is a cross-sectional view of the embodiment in FIG. 6.
Figure 8:
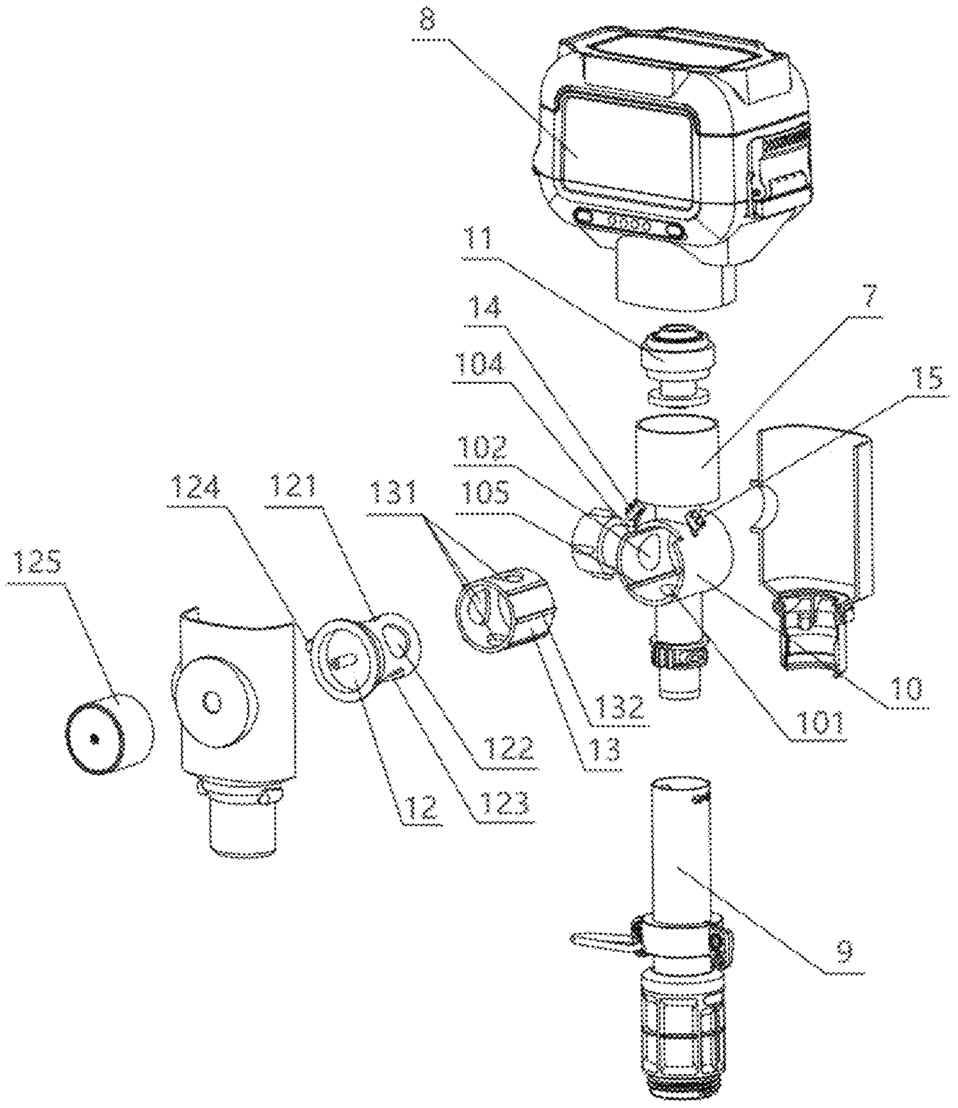
FIG. 8 is an exploded schematic diagram of the embodiment in FIG. 6.
Figure 9:
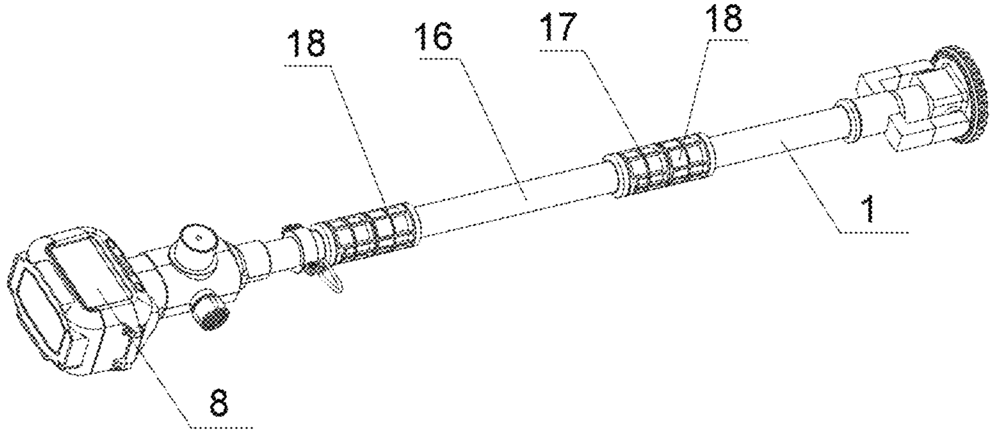
FIG. 9 is a three-dimensional schematic diagram of the connecting rod in FIG. 4.
Figure 10:
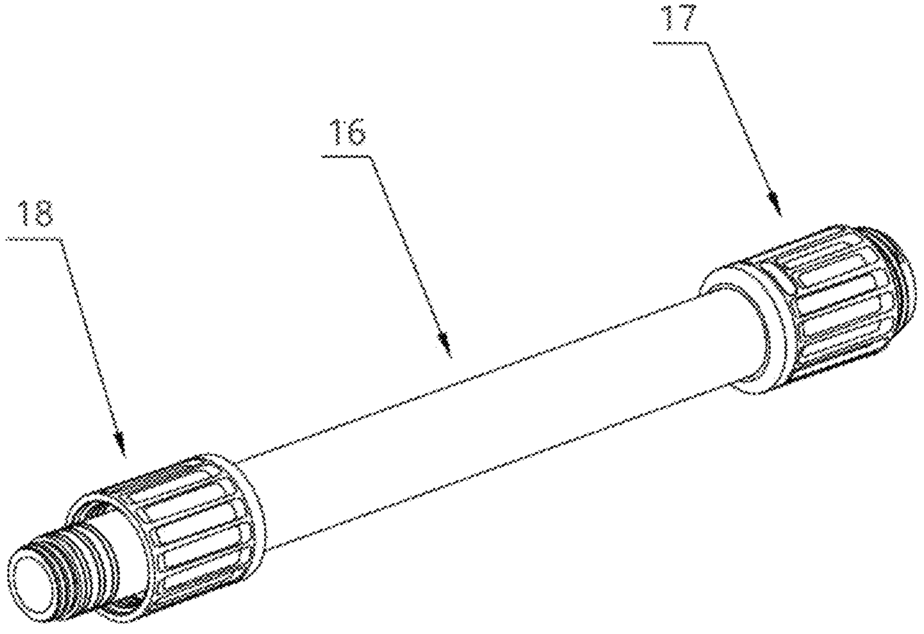
FIG. 10 is a schematic diagram of the overall external structure of FIG. 9.

As shown in FIGS. 7 and 8, the shaft seat 10 is provided with an air inlet 103. Air is supplied to the fan 11 through the air inlet 103 to facilitate the operation of the fan 11. A mode conversion mechanism is arranged inside the shaft seat 10 to realize the blowing or pumping of the rod-shaped water pump. The mode conversion mechanism includes a hollow rotating shaft 12. The rotating shaft 12 is inserted into the shaft seat 10 and is rotatably connected to the shaft seat 10. A first through-hole 121, a second through-hole 122, and a third through-hole 123 are sequentially arranged on the circumferential surface of the rotating shaft 12 and are spaced apart in the circumferential direction. An elastic sealing rubber sleeve 13 is arranged between the rotating shaft 12 and the shaft seat 10. The rotating shaft 12 and the shaft seat 10 are sealed by the sealing rubber sleeve 13 to prevent water leakage. The sealing rubber sleeve 13 is fixed inside the shaft seat 10. Three fourth through-holes 131 are arranged on the sealing rubber sleeve 13, corresponding to the air inlet 103, the water inlet 101, and the water outlet 102 respectively, which facilitates the cooperative use of the sealing rubber sleeve 13 with the air inlet 103, the water inlet 101, and the water outlet 102, so that the air inlet 103, the water inlet 101, and the water outlet 102 will not be affected by the sealing rubber sleeve 13.

The rotating shaft 12 and the sealing rubber sleeve 13 are in an interference fit and is rotatable relative to each other. Through the interference fit, the rotating shaft 12 and the sealing rubber sleeve 13 are tightly connected, so that the first through-hole 121, the second through-hole 122, and the third through-hole 123 on the rotating shaft 12 are in a sealed fit with the shaft seat 10, and there will be no water leakage between the rotating shaft 12 and the shaft seat 10.

In other embodiments (not shown), the hollow rotating shaft 12 forms a rotational fit with the shaft seat 10 through two sets of deep-groove ball bearings, which facilitates rotation without jamming.

In other embodiments (not shown), the number of through-holes in the rotating shaft 12 is increased to 6 groups, and the flow rate is adjusted in stages through staggered arrangement.

In other embodiments (not shown), the end of the rotating shaft 12 is connected to a stepping motor, and the motor is fixed on the side wall of the fixing seat 7 through a flange, which enables precise control.

In other embodiments (not shown), the inner surface of the sealing rubber sleeve 13 is provided with a spiral lubrication groove to reduce the friction coefficient.

In other embodiments (not shown), a second water inlet and a second water outlet are added to the shaft seat 10 to form a symmetrical double-flow-channel structure, which makes water inflow and outflow faster.

In other embodiments (not shown), the sealing rubber sleeve 13 adopts a double-layer design. The inner layer is a silicone dynamic sealing layer, and the outer layer is a PTFE wear-resistant layer filled with bronze powder, which improves the sealing effect of the sealing rubber sleeve 13 during use.

In other embodiments (not shown), the sealing rubber sleeve 13 is replaced with a multi-layer metal wound gasket with an embedded graphite sealing ring, and the pre-tightening force is dynamically compensated by a disc spring.

As shown in FIGS. 7 and 8, turn the rotating shaft 12. When the first through-hole 121 corresponds to the air inlet 103 and the third through-hole 123 corresponds to the water inlet 101, the rod-shaped pump is in the blowing mode, and the water outlet 102 is in a closed state. Turn the rotating shaft 12 clockwise. When the second through-hole 122 corresponds to the water inlet 101 and the third through-hole 123 corresponds to the water outlet 102, the rod-shaped pump is in the water-pumping mode, and the air inlet 103 is in a closed state.

A first triggering switch 14 and a second triggering switch 15 are fixedly arranged on the fixing seat 7. A triggering bump 124 is integrally arranged on the rotating shaft 12. A limit slot 104 is arranged on the circumferential surface of the shaft seat 10. The triggering bump 124 extends to the outside of the limit slot 104. When the rod-shaped pump is in the blowing mode, the triggering bump 124 is in contact with the first triggering switch 14.

When the rod-shaped pump is in the water-pumping mode, the triggering bump 124 is in contact with the second triggering switch 15. The rotation angle of the triggering bump 124 can be restricted through the limit slot 104, which also makes the conversion of the usage mode of the rod-shaped pump accurate. The first triggering switch 14 is electrically connected to the fan 11 and the power supply box 8, and the second triggering switch 15 is electrically connected to the power supply box 8 and the pump assembly 2. In order to facilitate the rotation of the rotating shaft 12, a knob 125 can be fixedly arranged at the outer end of the rotating shaft 12.

It can be understood that when dredging is required, turn the rotating shaft 12 so that the triggering bump 124 is in contact with the first triggering switch 14. At this time, the first through-hole 121 on the rotating shaft 12 is directly opposite to the air inlet 103 on the shaft seat 10, the third through-hole 123 on the rotating shaft 12 is directly opposite to the water inlet 101 on the shaft seat 10, the water outlet 102 is in a closed state, and the rod-shaped pump is in the blowing mode. At the same time, the fan 11 works, and blows air to the silt at the bottom of the water through the air inlet 103, the water inlet 101 and the fixing tube 9 to stir the silt. Then turn the rotating shaft 12 so that the second through-hole 122 is directly opposite to the water inlet 101, the third through-hole 123 is directly opposite to the water outlet 102, the air inlet 103 is in a closed state, and the rod-shaped pump is in the water-pumping mode. At this time, the triggering bump 124 is in contact with the second triggering switch 15, the fan 11 is powered off, the water pump works, pumps the sewage and discharges the sewage with silt through the fixing tube 9, the water inlet 101 and the water outlet 102.

In other embodiments (not shown), the first triggering switch 14 and the second triggering switch 15 are replaced with Hall sensors. A neodymium-iron-boron magnetic ring is embedded in the rotating shaft 12, and non-contact mode recognition is realized by detecting the change in magnetic field strength.

In other embodiments (not shown), the mechanical hard limit of the limit slot 104 and the trigger bump 124 plus the dual positioning of the electronic switch ensure that the repeatability accuracy of the mode switching reaches ±0.5°.

In the above embodiment, in order to limit the rotation of the sealing rubber sleeve 13 and fix it in the shaft seat 10, a positioning rib 132 can be integrally provided on the outer circumferential surface of the sealing rubber sleeve 13, and a positioning groove 105 is provided on the inner circumferential surface of the shaft seat 10. The positioning rib 132 is embedded in the positioning groove 105 to limit the position of the sealing rubber sleeve 13 and prevent it from rotating.

Figure 11:
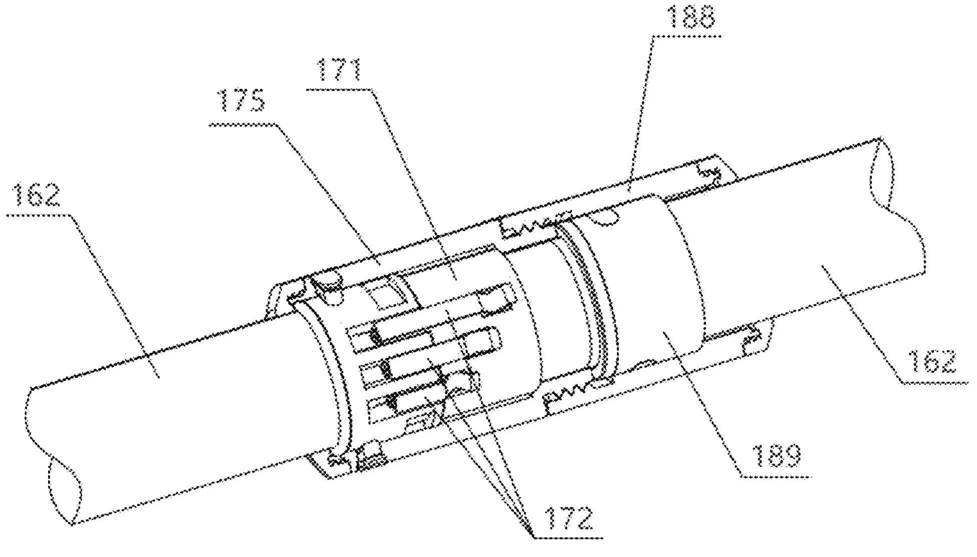
FIG. 11 is a schematic diagram of the docking of the male conductive connector and the female conductive connector in FIG. 9.
Figure 12:
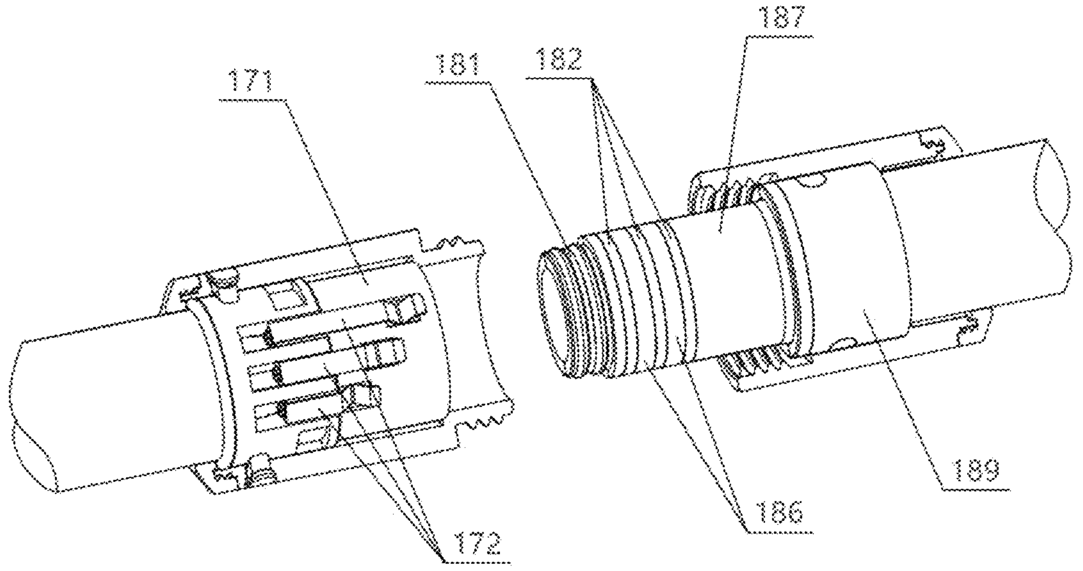
FIG. 12 is a schematic diagram of the state after the male conductive connector and the female conductive connector in FIG. 9 are disassembled.
Figure 15:
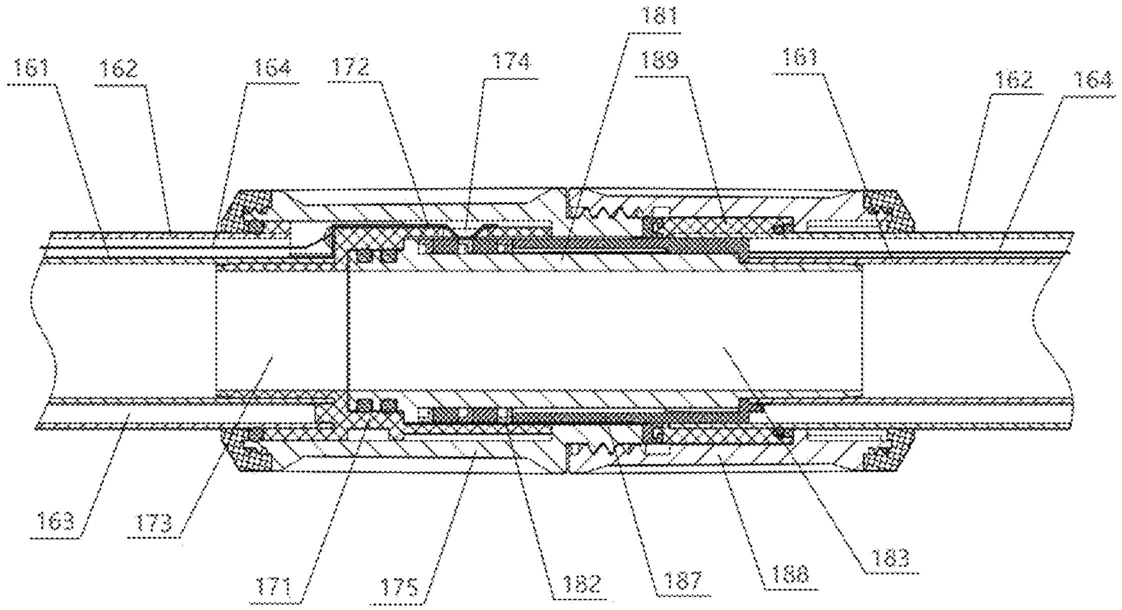
FIG. 15 is a cross-sectional view of the male conductive connector and the female conductive connector in FIG. 9 after docking.

As shown in FIGS. 4, 9 to 15, it also includes a connecting rod 16. The connecting rod 16 is arranged between the rod-shaped water pump body 1 and the fixing tube 9. One end of the connecting rod 16 is fixedly provided with a male conductive connector 17, and the other end is fixedly provided with a female conductive connector 18. The connecting rod 16 includes an inner tube 161 and an outer tube 162. The inner tube 161 is used for water or gas passage. The outer tube 162 is sleeved outside the inner tube 161, and there is a gap 163 between the inner tube 161 and the outer tube 162. The male conductive connector 17 and the female conductive connector 18 of the same connecting rod 16 are electrically connected through a wire 164. The wire 164 is located in the gap 163. The inside of the gap 163 is isolated from water entry and will not affect the wire 164. The wire 164 is protected by the outer tube 162 and the inner tube 161 to prevent the wire 164 from being damaged by water during the water absorption process of the connecting rod 16. Specifically:

As shown in FIGS. 11, 12 and 15, the male conductive connector 17 includes a first connector 171 and three conductive contact pieces 172. The first connector 171 is simultaneously sealed and fixed to one end of the inner tube 161 and the outer tube 162 by existing methods such as glue or ultrasonic waves. The existing methods such as glue or ultrasonic waves are simple and convenient for fixing and have a good sealing effect. A fifth through hole 173 is provided on the first connector 171. The fifth through hole 173 is communicated with the inner tube 161. The fifth through hole 173 is used for water flow during water absorption. The conductive contact pieces 172 are fixed on the first connector 171 at intervals. Three side holes 174 corresponding to the conductive contact pieces 172 are opened on the side wall of the first connector 171. The ends of the conductive contact pieces 172 are embedded in the side holes 174, making the fixing of the conductive contact pieces 172 on the first connector 171 stable and reliable.

It can be understood that by replacing the traditional connecting rod in the rod pump with the connecting rod 16, the wire 164 between the pump assembly 2 and the power supply box 8 can be separated from the pumped liquid, realizing the separation of water and electricity without interference, avoiding the corrosion of the wire 164 by the liquid and the safety hazards caused by wire leakage. Moreover, the connecting rod 16 can also be butted and lengthened as needed to meet the length requirements of the rod pump in different use places.

In addition, the end of the conductive contact piece 172 can also be directly extended out of the first connector 171, and the wire 164 passes through the first connector 171 and is fixedly connected to the conductive contact piece 172. One end of the outer tube 162 is fixed with a first connecting sleeve 175. The first connecting sleeve 175 and the first connector 171 are sealed by a sealing ring. The sealing ring ensures the sealing effect between the first connecting sleeve 175 and the first connector 171, preventing water leakage that may damage the wire 164.

In other embodiments (not shown), the first connector 171 is double-sealed and fixed by ultrasonic welding to improve the sealing effect between the first connector 171 and the first connecting sleeve 175 and prevent damage to the wire 164.

In other embodiments (not shown), three gold-plated conductive contact pieces 172 are distributed in a 120° circular array and are embedded in the side holes 174 through a stamping process to form a mechanical interlock, improving the stability of the conductive contact pieces 172.

In other embodiments (not shown), the first connecting sleeve 175 is equipped with a fluororubber sealing ring to provide IP68-level protection, improving the sealing performance of the first connecting sleeve 175.

Figure 13:
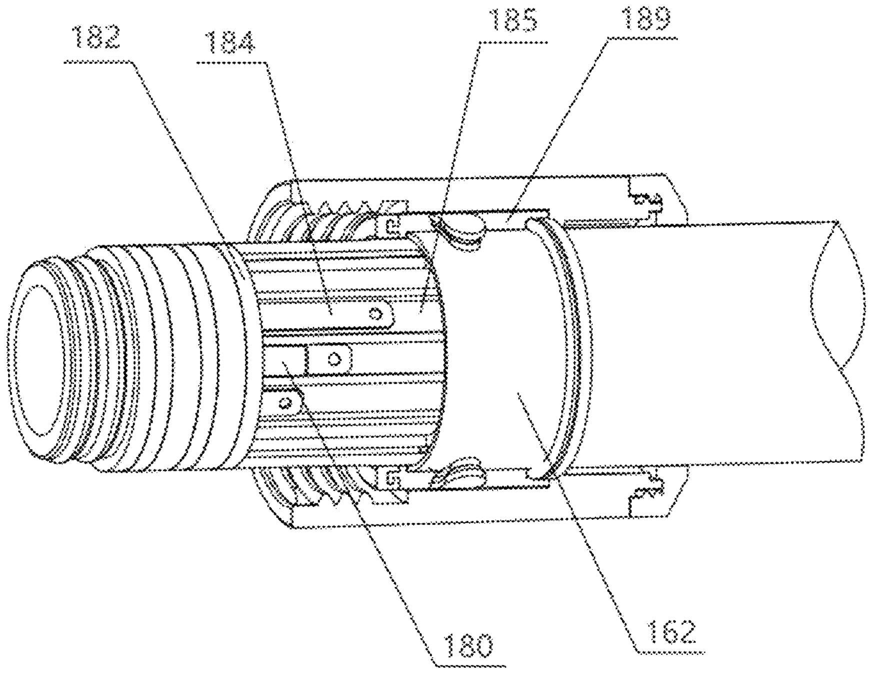
FIG. 13 is a schematic diagram of the internal structure of the female conductive connector in FIG. 9 after removing the pressing sleeve.
Figure 14:
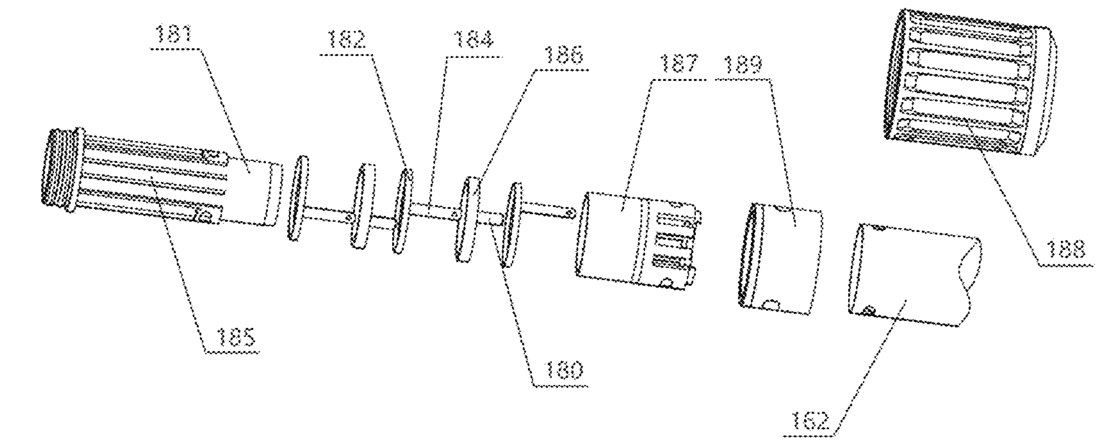
FIG. 14 is an exploded schematic diagram of the female conductive connector in FIG. 9.

As shown in FIGS. 13, 14, and 15, the female conductive connector 18 includes a second connector 181 and three conductive rings 182. The second connector 181 and the other end of the inner tube 161 are sealed and fixed by existing methods such as glue or ultrasonic waves. Existing methods such as glue or ultrasonic waves are simple and convenient for fixing and have a good sealing effect. The second connector 181 is provided with a sixth through-hole 183, which is in communication with the inner tube 161. The conductive rings 182 are sequentially sleeved on the second connector 181. The conductive rings 182 are fixedly provided with conductive connecting pins 184. The outer surface of the side wall of the second connector 181 is provided with a plurality of positioning grooves 185. The conductive connecting pins 184 are embedded in the positioning grooves 185 in a one-to-one correspondence to prevent the conductive rings 182 from rotating and causing the wire 164 to be entangled. An insulating ring 186 is provided between two adjacent conductive rings 182 to prevent damage caused by mutual electrification between the two conductive rings 182.

A pressing sleeve 187 is sleeved on the second connector 181. The pressing sleeve 187 abuts against the outermost conductive ring 182, and the pressing sleeve 187 is sealed and fixed between the other end of the outer tube 162 and the second connector 181. By improving the sealing between the pressing sleeve 187 and the other end of the outer tube 162 and the second connector 181, water leakage is prevented. The wire 164 passes through the pressing sleeve 187 and is fixedly connected to the conductive connecting pin 184. The other end of the outer tube 162 is rotatably connected to a second connecting sleeve 188. The second connecting sleeve 188 is in sealed cooperation with the outer tube 162 to prevent water leakage. A limit ring 189 is fixedly sleeved on the other end of the outer tube 162, and the second connecting sleeve 188 is sleeved outside the limit ring 189 to prevent the second connecting sleeve 188 from separating from the outer tube 162 and improve the connection stability between the second connecting sleeve 188 and the outer tube 162.

In other embodiments (not shown), the conductive rings 182 and the insulating rings 186 are alternately stacked and form an integrated insulating skeleton with the second connector 181 through an injection molding process, which has good insulation effect and good sealing performance.

In other embodiments (not shown), the pressing sleeve 187 achieves triple sealing through the pre-tightening force of the thread: 1. Axially compress the conductive ring set; 2. Radially seal the outer tube port; 3. Seal the second connector on the end face.

In other embodiments (not shown), the number of the conductive contact pieces 172 and the conductive rings 182 is increased to 6 groups to improve the power supply effect.

In other embodiments (not shown), 6 axial keyways are machined on the outer wall of the second connector 181, and the conductive connecting pin 184 is changed to a T-shaped structure and embedded in the keyway to stably fix the conductive connecting pin 184.

In other embodiments (not shown), the wire 164 is replaced with a high-temperature silicone wire, and the gap 163 is filled with thermal conductive silicone grease to improve the heat dissipation performance.

In other embodiments (not shown), the first connecting sleeve 175 adopts a spring clamp quick-release structure, and the second connecting sleeve 188 is changed to a bayonet-type connection with a positioning pin, which is convenient for disassembly and assembly and replacement.

In other embodiments (not shown), the conductive contact piece 172 is changed to a telescopic probe structure, and the contact pressure is adjustable. The contact pressure can be adjusted as needed to prevent damage caused by excessive contact pressure for a long time.

In other embodiments (not shown), an LED indicator light is embedded on the surface of the outer tube 162 and is powered by the wire 164 to display the connection status.

In specific implementation, when the male conductive connector 17 on one connecting rod 16 is butted with the female conductive connector 18 on its adjacent connecting rod 16, the first connector 171 on the connecting rod 16 is sealingly sleeved on the second connector 181 on the adjacent connecting rod 16, the fifth through-hole 173 is in communication with the sixth through-hole 183, the ends of the conductive contact pieces 172 are in one-to-one contact with the conductive rings 182, and the first connecting sleeve 175 is screwed and fixed with the second connecting sleeve 188. The screw-connection fixation facilitates disassembly and has a good fixing effect, so that the male conductive connector 17 is butted and fixed with the female conductive connector 18 on its adjacent connecting rod 16 and electrical conduction is achieved.

In the above-mentioned embodiment, the number of the conductive contact pieces 172 and the conductive rings 182 can also be set to 2 according to the number of poles of the power supply on the rod pump; and in order to prevent the conductive connecting pins 184 on the conductive ring 182 from tilting up during assembly, an insulating presser foot 180 can also be integrally provided on the insulating ring 186. The insulating presser foot 180 is embedded in the positioning groove 185 and pressed on the conductive connecting pins 184 to fix the conductive connecting pins 184.

In other embodiments (not shown), the insulating presser foot 180 is upgraded to a labyrinth structure with a buckle and forms an integral part with the insulating ring 186 through a two-shot injection molding process to prevent the insulating presser foot 180 from loosening during use and thus affecting the insulation effect.

In addition, the first connecting sleeve 175 can be set to be rotatably connected to one end of the outer tube 162, while the second connecting sleeve 188 is fixedly connected to the other end of the outer tube 162. At this time, the limit ring 189 can be omitted or fixed to one end of the outer tube 162. In addition, the male conductive connector 17 or the female conductive connector 18 can also be fixedly provided only at one end of the connecting rod 16.

The end without the male conductive connector 17 and the female conductive connector 18 is connected to the pump assembly 2 or the power supply box 8, and the fixing method is the same as that of the existing connecting rod; when the two ends of the connecting rod 16 are respectively provided with the male conductive connector 17 and the female conductive connector 18, it is only necessary to respectively provide the butted male conductive connector 17 and the female conductive connector 18 on the pump assembly 2 and the power supply box 8, so that the pump assembly 2 can be powered by the power supply box 8.

In other embodiments (not shown), the inner tube 161 and the outer tube 162 are changed to independent parallel and juxtaposed tubes (such as arranged in a triangle or rectangle), and the wire 164 is separately arranged in a secondary tube.

In other embodiments (not shown), the circumferentially distributed conductive contact pieces 172 are changed to axially arranged elastic probes, and the conductive rings 182 are changed to planar conductive sheets to facilitate the contact between the conductive contact pieces 172 and the conductive rings 182.

The preferred embodiments provided by the present disclosure can be operated by the following methods:

In summary, the present disclosure achieves the following technical effects:

Since a connecting frame 3 is fixed at the lower end of the rod-shaped water pump body 1, and the pump assembly 2 is hinged to the connecting frame 3, the pump assembly 2 is rotatable. When in use, even if the rod-shaped water pump is leaned against a pool or other places, the bottom surface of the pump assembly 2 can fit the bottom of the pool or other places, so that the rod-shaped water pump can automatically suck water and other liquids in the pool or other places dry without the user's hand support, which is very convenient to use. Also, since a telescopic rod 6 is provided on the rod-shaped water pump body 1, the telescopic rod 6 can be pulled out as a support leg as needed, so that the rod-shaped water pump is in an upright state. When not in use, the telescopic rod 6 can be retracted and used as an auxiliary handle 19.

When dredging is needed, rotate the rotating shaft 12 so that the triggering bump 124 contacts the first triggering switch 14. At this time, the first through hole 121 on the rotating shaft 12 is directly opposite to the air inlet 103 on the shaft seat 10, the third through hole 123 on the rotating shaft 12 is directly opposite to the water inlet 101 on the shaft seat 10, and the water outlet 102 is in a closed state. The rod-shaped water pump is in the blowing mode. At the same time, the fan 11 works, and blows air to the sludge at the bottom of the water through the air inlet 103, the water inlet 101 and the fixing tube 9 to stir the sludge. Then rotate the rotating shaft 12 so that the second through hole 122 is directly opposite to the water inlet 101, the third through hole 123 is directly opposite to the water outlet 102, and the air inlet 103 is in a closed state. The rod-shaped water pump is in the pumping mode. At this time, the triggering bump 124 contacts the second triggering switch 15, the fan 11 is powered off, the water pump works, pumps the sewage and discharges the sewage with sludge through the fixing tube 9, the water inlet 101 and the water outlet 102.

By replacing the traditional connecting rod in the rod pump with the connecting rod 16, the wire 164 between the pump assembly 2 and the power box 8 can be separated from the liquid being pumped, realizing the separation of water and electricity without interference, avoiding the corrosion of the wire 164 by the liquid and the safety hazards caused by wire leakage. Moreover, the connecting rod 16 can be butted and lengthened as needed to meet the length requirements of the rod pump in different use places. In addition, this rod-shaped pump can also be used in scenarios such as mechanical tools requiring easy disassembly/assembly and length adjustment.

In the description of the present disclosure, it should be appreciated that directional terms such as "front, rear, up, down, left, right", "horizontal, vertical, perpendicular, horizontal" and "top, bottom" etc. indicate the orientation or positional relationship based on the orientation or positional relationship shown in the drawings, and are only for the convenience of describing the present disclosure and simplifying the description. In the absence of a contrary explanation, these directional terms do not indicate or imply that the device or element referred to must have a specific orientation or be constructed and operated in a specific orientation, and therefore should not be understood as limiting the scope of protection of the present disclosure; the directional terms "inside, outside" refer to the inside and outside relative to the contour of each component itself.

For the convenience of description, spatial relative terms such as "on . . . ", "above . . . ", "on the upper surface of . . . ", "upper" etc. may be used here to describe the spatial positional relationship of a device or feature with other devices or features as shown in the drawings. It should be appreciated that spatial relative terms are intended to encompass different orientations of the device in use or operation other than the orientation described in the drawings. For example, if the device in the drawing is inverted, the device described as "above other devices or structures" or "on other devices or structures" will subsequently be positioned as "below other devices or structures" or "under other devices or structures". Thus, the exemplary term "above" can include both "above" and "below" orientations. The device can also be positioned in other different ways (rotated 90 degrees or in other orientations), and the spatial relative descriptions used here should be interpreted accordingly.

In addition, it should be noted that the use of terms such as "first", "second" etc. to define components is for the convenience of distinguishing the corresponding components. Unless otherwise stated, the above terms have no special meaning, and therefore should not be understood as limiting the scope of protection of the present disclosure.

The above description is only a preferred embodiment of the present disclosure and is not intended to limit the present disclosure. For those skilled in the art, the present disclosure can have various modifications and changes. Any modifications, equivalent replacements, improvements etc. made within the spirit and principles of the present disclosure should be included within the scope of protection of the present disclosure.

What is claimed is:

1. A connecting rod assembly usable for a rod pump, comprising a plurality of connecting rods;
- wherein the plurality of connecting rods comprises a connecting rod and an adjacent connecting rod;
- wherein at least one end of the connecting rod is fixedly provided with a first male conductive connector or a first female conductive connector;
- wherein the connecting rod comprises an inner tube and an outer tube, the outer tube is sleeved outside the inner tube, and a gap exists between the inner tube and the outer tube;
- wherein the first male conductive connector or the first female conductive connector are electrically connected with wires, which are located within the gap;
- wherein the inner tube is configured for water or air passage;
- wherein at least one end of the adjacent connecting rod is fixedly provided with a second male conductive connector docked and fixed with the first female conductive connector to achieve conductivity or wherein at least one end of the adjacent connecting rod is fixedly provided with a second female conductive connector docked and fixed with the first male conductive connector to achieve conductivity.

2. The connecting rod assembly usable for a rod pump according to claim 1, wherein one end of the connecting rod is fixedly provided with the first male conductive connector, another end of the connecting rod is fixedly provided with the first female conductive connector, and the first male conductive connector and the first female conductive connector at both ends of the connecting rod are electrically connected via a wire.

3. The connecting rod assembly usable for a rod pump according to claim 2, wherein the first male conductive connector comprises a first connector and at least two conductive contact pieces, the first connector is sealingly fixed to both one end of the inner tube and one end of the outer tube, and the first connector is provided with a first through hole communicating with the inner tube; the at least two conductive contact pieces are spaced and fixed on the first connector, and the wire passes through the first connector to be electrically connected with the at least two conductive contact pieces, and one end of the outer tube is rotatably or fixedly connected with a first connecting sleeve, which is sealed with the first connector.

4. The connecting rod assembly usable for a rod pump according to claim 3, wherein an end of each of the at least two conductive contact pieces extends outside the first connector, or a side wall of the first connector is provided with at least two side holes corresponding one-to-one with the positions of the at least two conductive contact pieces, with end portions of the at least two conductive contact pieces being embedded in the side holes.

5. The connecting rod assembly usable for a rod pump according to claim 3, wherein the first female conductive connector comprises a second connector and at least two conductive rings, the second connector is fixed to the other end of the inner tube; the second connector is provided with a second through hole communicating with the inner tube; a number of the conductive rings is equal to that of the at least two conductive contact pieces, the conductive rings are sequentially sleeved on the second connector, and an insulating ring is arranged between every two adjacent conductive rings; conductive connection legs are fixed on the conductive rings, a compression sleeve is sleeved on the second connector and abuts against an outermost conductive ring, and the compression sleeve is sealingly fixed to both the other end of the outer tube and the second connector; and the wire passes through the compression sleeve and is electrically connected to the conductive connection leg, and the other end of the outer tube is rotatably or fixedly connected with a second connecting sleeve, which is in seal fit with the outer tube.

6. The connecting rod assembly usable for a rod pump according to claim 5, wherein when the first connector on the connecting rod is sealingly butted with a second connector on the adjacent connecting rod, the first through hole is connected to the second through hole, the ends of the at least two conductive contact pieces are in one-to-one contact with the conductive rings, and the first connecting sleeve is fixed with the second connecting sleeve by screws.

7. The connecting rod assembly usable for a rod pump according to claim 5, wherein an outer surface of a side wall of the second connector of the first female conductive connector is provided with a plurality of positioning grooves, and the conductive connection legs are embedded in the positioning grooves in one-to-one correspondence to prevent the conductive rings from rotating.

8. The connecting rod assembly usable for a rod pump according to claim 7, wherein the insulating ring is integrally provided with insulating presser feet, which are embedded in the positioning grooves and are pressed on the conductive connection legs to prevent the conductive connection legs from tilting.

9. The connecting rod assembly usable for a rod pump according to claim 5, wherein the other end of the outer tube is fixedly sleeved with a limit ring, and the second connecting sleeve is sleeved outside the limit ring to prevent the second connecting sleeve from detaching from the outer tube.

10. The connecting rod assembly usable for a rod pump according to claim 3, wherein there are three conductive contact pieces.

11. A connecting rod assembly usable for a rod pump, comprising:

an inner tube and an outer tube arranged coaxially, with a sealed annular gap formed between the inner tube and the outer tube;

a conductive circuit arranged in the annular gap; and a male conductive connector located at a first end of a connecting rod, comprising:

a first connector sealingly fixed to the inner tube;

a plurality of conductive contact pieces; and a first through hole penetrating the inner tube; and a female conductive connector located at a second end of the connecting rod, comprising:

a second connector sealingly fixed to the inner tube;

conductive rings and insulating rings; and a second through hole penetrating the inner tube;

wherein the conductive contact pieces form a detachable electrical connection with the conductive rings, and the first through hole and the second through hole form a continuous fluid channel.

12. The connecting rod assembly for a rod pump according to claim 11, wherein an outer wall of the outer tube is provided with an axially extending reinforcing rib, and the reinforcing rib has a trapezoidal cross section.

13. The connecting rod assembly for a rod pump according to claim 11, wherein the conductive contact pieces are distributed equally by 120° along a circumferential direction of the male conductive connector.

14. The connecting rod assembly for a rod pump according to claim 11, wherein the conductive rings and insulating rings are alternately arranged in a plurality of layers.

15. The connecting rod assembly for a rod pump according to claim 11, wherein the conductive circuit comprises a plurality of independent channels, supporting simultaneous operation of power transmission, signal communication, and grounding loops.

16. A connecting rod assembly for a rod pump, comprising:

a main delivery tube internally provided with a fluid channel;

a conductive tube arranged outside the main delivery tube in parallel, internally provided with a conductive circuit;

a plug connecting part located at a first end of a connecting rod, provided with conductive probes and a fluid plug connector; and a receptacle part located at a second end of the connecting rod, provided with a conductive contact piece matching a conductive probe of the conductive probes and a fluid socket;

wherein the fluid plug connector is provided with a diversion channel, which connects the fluid plug connector and the main delivery tube.

17. The connecting rod assembly for a rod pump according to claim 16, wherein the conductive probes are arranged axially along the fluid plug connector.

18. The connecting rod assembly for a rod pump according to claim 16, wherein there are two conductive tubes symmetrically distributed on both radial sides of the main delivery tube, and the conductive tubes have a semicircular cross section, with a curved surface fitting an outer wall of the main delivery tube.

19. The connecting rod assembly for a rod pump according to claim 16, wherein an end of the fluid plug connector has a stepped conical structure.

20. The connecting rod assembly for a rod pump according to claim 16, wherein the conductive probe adopts a bimetal composite structure, and a tip of the probe is provided with a spherical contact head.

* * * * *